Figure 2:
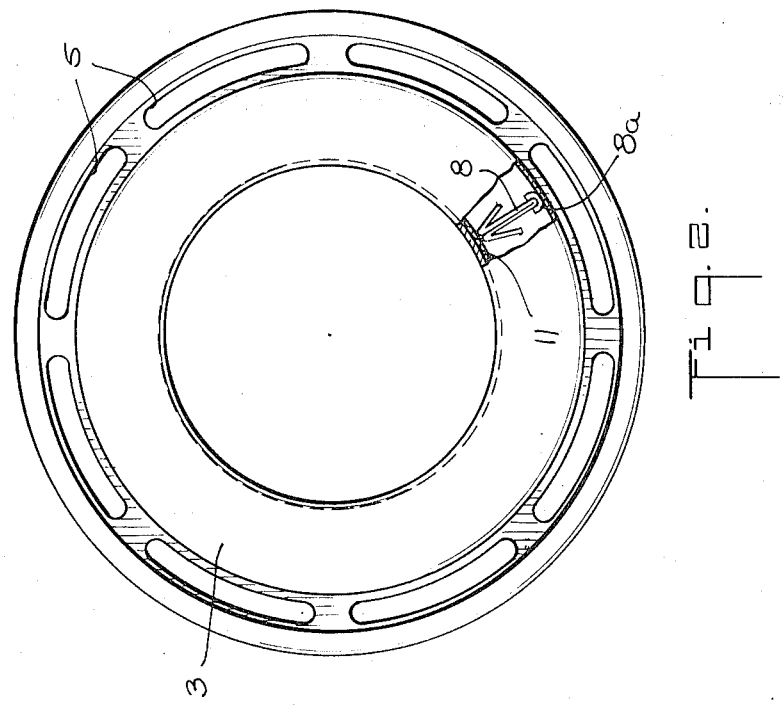

United States Patent [19]
Szmutko

[11] 3,785,129
[45] Jan. 15, 1974

[54] SPIN-ON AIR FILTER
[75] Inventor: Charles J. Szmutko, Edison, N.J.
[73] Assignee: Purolator, Inc., Rahway, N.J.
[22] Filed: Nov. 1, 1971
[21] Appl. No.: 194,352

[52] U.S. Cl............... 55/419, 55/498, 55/505, 55/510, 55/514, 55/521, 210/493
[51] Int. Cl............................................ B01d 27/08
[58] Field of Search............... 55/385, 419, 498, 55/502, 504, 505, 510, 521; 210/440, 443, 457, 493, DIG. 17

[56] References Cited
UNITED STATES PATENTS

| | | | |
|---|---|---|---|
| 1,215,974 | 2/1917 | Orem | 55/505 |
| 2,973,832 | 3/1961 | Cook et al. | 55/385 |
| 3,085,383 | 4/1963 | Garbig | 55/504 |
| 3,167,416 | 1/1965 | Humbert, Jr. et al. | 55/419 |
| 3,197,029 | 7/1965 | Yelink et al. | 210/DIG. 17 |

FOREIGN PATENTS OR APPLICATIONS 825,299  12/1959  Great Britain........................ 55/510

*Primary Examiner*—Bernard Nozick
*Attorney*—Charles B. Spencer

[57] ABSTRACT

A spin-on air filter has a casing and end cap forming opposing seats, and a pleated paper annular filter element has its ends closed by these seats to provide for radial air flow through the element.

2 Claims, 2 Drawing Figures

PATENTED JAN 15 1974 3,785,129

SPIN-ON AIR FILTER

This invention relates to air filters for the intakes of internal combustion engines, and it is particularly concerned with such a filter for relatively small industrial engine applications.

For such an application an air filter usually comprises a reusable or permanent casing construction that must be taken apart for servicing and, therefore, involves separable interfitting parts making its manufacture expensive and contributing to the engine manufacturer's equipment costs to an undesirable degree. Furthermore, the engine user must disassemble and reassemble the filter parts when the filter element becomes too contaminated by airborne particles to permit continued efficient engine operation.

Contrastingly, automotive oil filters of the spin-on or throw-away type made by filter manufacturers at relatively low cost have correspondingly reduced the engine manufacturer's costs while providing for easy user servicing because the entire unit is unscrewed, thrown away and replaced by a new unit easily.

With the foregoing in mind, the object of the present invention is to provide a spin-on air filter which can be made at low cost by a filter manufacturer, supplied to the engine manufacturer with a consequent reduction in his manufacturing costs, and which can be as easily handled by the engine user as is a spin-on oil filter.

Summarizing the invention, it is a spin-on air filter comprising a cylindrical casing having a closed end and an open end, and a circular end cap closing this open end and having a central air outlet that is threaded for spin-on application and removal and a peripheral annular series of air inlet ports with a flat annular internal seat between this outlet and these inlet ports. The casing's closed end also has an annular internal seat facing the end cap's seat and a pleated paper annular filter element is positioned in the casing with its ends positioned on these seats. The element's ends and the seats can be sealed air-tight by cement as an initial step in the assembly of the filter, with the casing's closed end and the end cap functioning in place of the separate end caps heretofore used to close the ends of such an element, because the periphery of the casing's open end and of the end cap is interconnected by a mechanical inter-lock seam which can be formed after the cementing operation.

Figure 1:
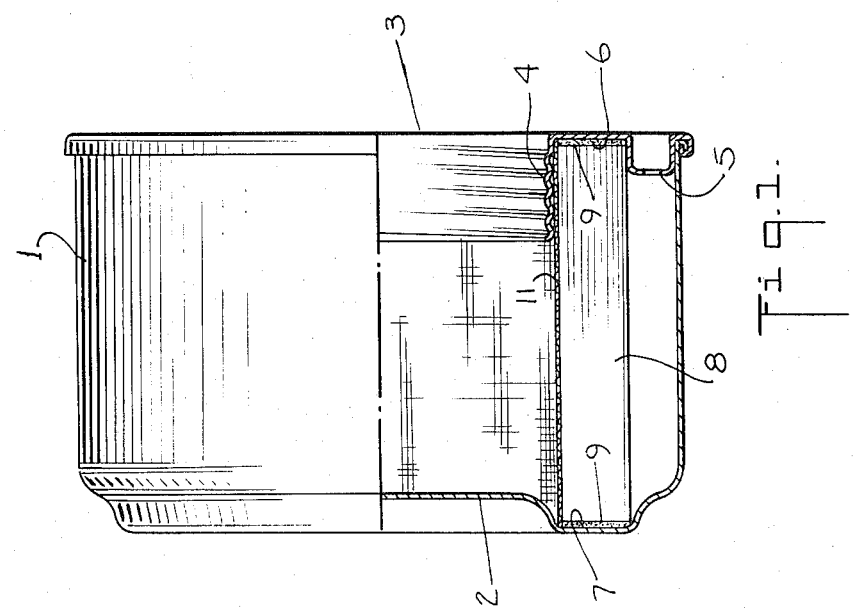

Other details contributing to the value of the new air filter of the present invention may be understood by reference to the accompanying drawings in which:

FIG. 1 is a side view of the new filter, half in elevation and half in longitudinal section; and FIG. 2 is a bottom view with the end cap partially broken away to expose the end of the filter element.

Referring to the above drawings, a cylindrical casing 1 has a closed end 2 and an open end closed by a circular end cap 3 which has a central air outlet 4 and a peripheral annular series of air inlet ports 5. The end cap has a flat annular internal seat 6 between the outlet 4 and the inlet ports 5, and the casing's closed end 2 has an annular flat seat 7 facing the end cap's seat 6. A pleated paper annular filter element 8, held closed by a clip 8a, is positioned in the casing 1 with its ends positioned on the seats 6 and 7, respectively, these seats being registered with each other in the axial direction of the filter.

The ends of the element 8 are sealed with the seats 6 and 7 by cement indicated at 9. This cement may be of the type usually used to seal the separate end caps to the ends of the pleated paper annular filter element of the prior art type. In the present instance, during assembly, the cement is applied to the seat 7, one end of the element 8 is pressed against the seat 7, the cement is placed on the seat 6, and the end cap is applied so that the other end of the element 8 is pressed against the seat 6. This procedure is possible because the peripheries of the casing's open end and of the end cap 3 are interconnected by a mechanical inter-lock seam 10 which can be formed as the end cap is moved to a position pressing the seat 6, to which the cement was applied, against that end of the element 8. Thereafter, the entire filter may be heated, if this is necessary to set or cure the cement 9.

The paper element 8 is ordinarily treated to make it flame resistant in case of an engine backfire, and for further protection the new filter includes a woven wire screen 11 of a mesh size suitable to retard the passage of flame. This screen is cylindrical, fits against the inside of the annular paper element 8, and has its ends positioned on or in the seats 6 and 7 respectively.

The casing 1 and its closed end 2 and seat 7 is an integral sheet metal unit, its seat 7 being formed as a flat bottomed outwardly extending channel. Normal deep drawing and stamping techniques are applicable to the manufacture of this casing. Correspondingly, the end cap 3 is also an integral sheet metal unit and its seat 6 is also formed as a flat bottomed outwardly extending channel. The element's ends and the ends of the screen 11 are radially confined in these channels. The inner peripheral wall of the channel forming the seat 6 in the end cap 3 is extended inwardly towards the casing's closed end 2 to form the outlet 4, and screw threads are formed in this sheet metal tubular part. Again, normal deep drawing and stamping techniques are applicable to the manufacture of this end cap.

It can be seen that this new spin-on air filter comprises only two sheet metal units, the paper element 8, the screen 11 and the cement 9, if the latter can be considered a part, as contrasted to the many parts required to make the prior art type of filter as heretofore supplied to the manufacturer of small industrial engines.

It is to be understood that the type of engine referred to heretofore is the usual small four-cycle gasoline engine used for industrial applications and the like and having a carburetor with an air intake that is ordinarily not threaded. For the application of this new spin-on filter the carburetor manufacturers will supply appropriately threaded intakes for the use of the piesent invention. In the meantime, adaptors, not shown, will be used, these consisting of a simple part appropriately threaded and provided with clamping means for attachment to the carburetor intake.

The new filter construction may, of course, be used for other applications than indicated herein.

What is claimed is:

1. A spin-on air filter comprising a cylindrical casing having a closed end and an open end, a circular end cap for said open end and having a central air outlet and a peripheral annular series of air inlet ports and an annular internal seat between this outlet and these inlet ports, said closed end having an annular internal seat facing said end cap's seat, and a pleated paper annular filter element positioned in said casing with its ends positioned on said seats; and in which said element's ends are sealed with said seats by cement, the peripheries of said casing's open end and of said end cap are interconnected by a mechanical inter-lock seam, said outlet is threaded to screw on a threaded air intake connection of an internal combustion engine, and said casing and said end cap are each an integral sheet metal unit with said seats formed as flat bottomed outwardly extending channels in the casing's said closed end and said end cap respectively, said element's ends being radially confined in said channels, the inner peripheral wall of the channel in said end cap extending inwardly towards said casing's closed end to form said outlet.

2. The filter of claim 1 in which a wire mesh cylindrical screen is positioned on the inside of said element and the ends of this screen are positioned on said seats.

* * * * *